United States Patent
Hwang et al.

(10) Patent No.: US 6,433,350 B2
(45) Date of Patent: Aug. 13, 2002

(54) MULTI-RANGE FIBER-OPTIC REFLECTIVE DISPLACEMENT MICROMETER

(75) Inventors: Gwo-Jen Hwang, Hsinchu Hsien (TW); Wen H. Ko, Cleveland Heights, OH (US)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/853,147

(22) Filed: May 10, 2001

(30) Foreign Application Priority Data

Jun. 8, 2000 (TW) ........................... 89111372 A

(51) Int. Cl.⁷ ............... G01N 21/86; G01V 8/00
(52) U.S. Cl. ............... 250/559.11; 250/559.15; 250/559.29
(58) Field of Search ............ 250/559.11, 559.15, 250/559.12, 559.13, 559.14, 559.1, 559.03, 559.29; 385/12

(56) References Cited

U.S. PATENT DOCUMENTS 5,068,527 A  11/1991  Iwamoto et al.
6,307,617 B1 * 10/2001  Nishiki et al. ............... 385/37

* cited by examiner

Primary Examiner—Hung Xuan Dang

(57) ABSTRACT

This invention discloses a multi-range fiber-optic reflective micrometer, which comprises a light source for emitting a beam to an object surface, a receiving fiber-optic array, a photo-detector array, and a processor. The processor output a measured value in accordance with a differential signal and a summation signal both derived from the two electric signals corresponding to two adjacent receiving optical fibers which output two sampled lights of stronger intensities as well as a scale voltage. Since the ratio of the differential and the summation signals is proportional to a section of a whole displacement of the object, the whole measuring range could be extended by increasing the number of the receiving optical fibers while its resolution is kept at a degree of deep-sub-micrometer. Moreover, since the measured value is based upon a ratio of the differential signal to the summation signal, its accuracy will not be influenced by the fluctuation in the intensity of the light source and in the reflecting surface.

7 Claims, 2 Drawing Sheets

MULTI-RANGE FIBER-OPTIC REFLECTIVE DISPLACEMENT MICROMETER

BACKGROUND OF THE INVENTION

1. Field of the Invention

The present invention relates to a fiber-optic reflective displacement micrometer and, in particular, to a multi-range fiber-optic reflective displacement micrometer which can arbitrarily change measuring ranges to measure a displacement and its relevant physical quantities such as surface roughness and flatness.

2. Description of the Related Art

The conventional fiber-optic reflective displacement micrometer is constructed by directing light from a light source through a transmitting optical fiber to an object whose displacement is to be measured and then measuring the amount of light reflected from the surface of the object so as to obtain the displacement of the object. For compensating the fluctuations in the intensity of the light and the reflectivity of the surface of the object, a method of utilizing a light from a reference optical fiber and one utilizing a ratio resulting from two receiving optical fibers are ever adopted.

However, the above conventional fiber-optic reflective displacement micrometer has some drawbacks as the follows. Firstly, the resolution of the conventional fiber-optic displacement micrometer is only at the degree of sub-millimeter and thus is not able to perform a measurement for a tiny displacement. Secondly, the measuring scope of the prior art micrometer is very small and thus is only suitable for a measurement for a short-distance displacement.

To obtain a larger measuring range, a fiber-optic reflective displacement micrometer incorporating with a number of lenses, such as U.S. Pat. No. 5,068,527, has ever been proposed. However, such a micrometer is very complicated.

SUMMARY OF THE INVENTION

An object of this invention is to provide a multi-range fiber-optic reflective displacement micrometer which has a resolution in the degree of sub-micrometer and a measuring range up to several millimeters or centimeters.

Another object of this invention is to provide a multi-range fiber-optic reflective displacement micrometer whose measuring range can be changed by a change in the quantity of the receiving optical fibers so as to meet need for displacement measurement or one for surface flatness in different ranges.

To achieve the above objects, the present invention discloses a multi-range fiber-optic reflective displacement micrometer comprising:

a light-source for emitting a beam to a surface of an object;

a receiving fiber-optic array including a plurality of receiving optical fibers parallel to each other so as to sample a light reflected from the surface of the object and to output a sampled light therefrom;

a photo-detector array including a plurality of optic-receivers corresponding in quantity to the receiving optical fibers so as to receive the sampled light output from the corresponding receiving optical fiber and to output an electric signal corresponding to the sampled light; and a processor for producing a measured value representative of the displacement of the object in accordance with the electric signals output by the photo-detector array.

By means of the above structure, the measuring range of the displacement micrometer could be extended by a change in the quantity of the receiving optical fibers located in a region the reflected light could sweep and by a corresponding change in the quantity of the photo-detector.

In a preferred embodiment, the measured value representative of the displacement of the object is derived from a ratio of a differential signal to a composite signal both derived from two adjacent receiving optical fibers which have stronger sampled light. Since such a ratio corresponds to a sectional displacement of the object to be measured, the displacement to be measured is thus extensible with a resolution in the degree of deep-sub-micrometer and such the measurement of the displacement is free to be affected by the fluctuations in the intensity of the light-source and in the property of the reflecting surface.

The above and other objects, features and advantages will become apparent from the following detailed description of preferred embodiments in conjunction with the accompanying drawings.

DETAILED DESCRIPTION OF THE INVENTION

Figure 1:
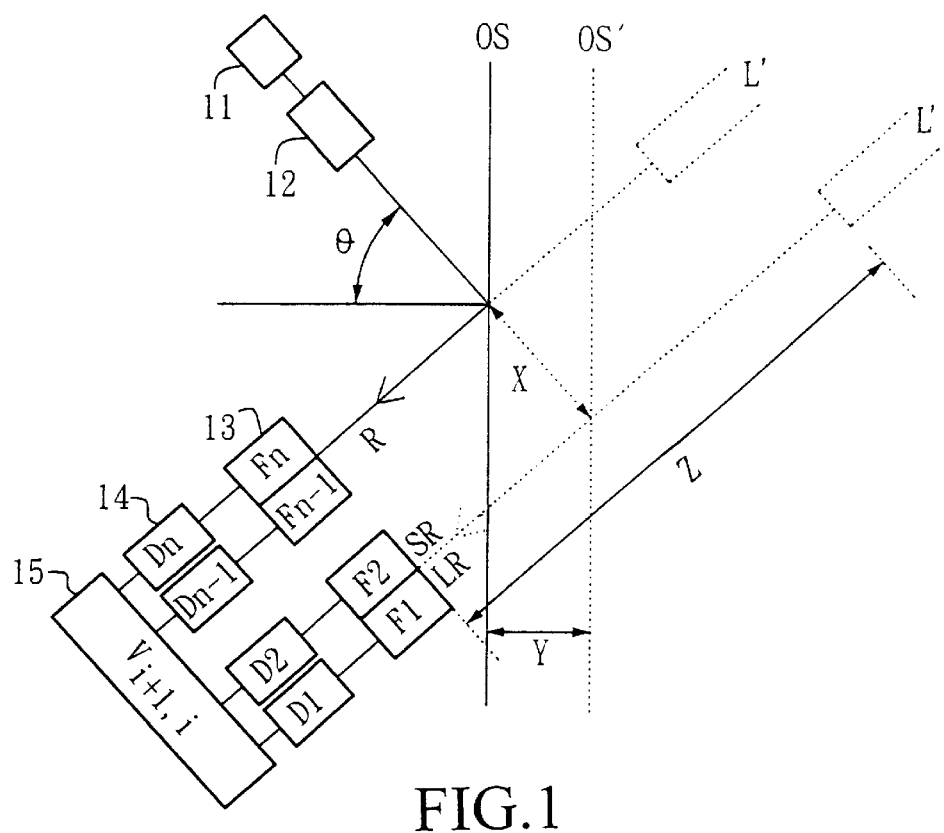
FIG. 1 is a schematic drawing showing a system of a multi-range fiber-optic reflective displacement micrometer according to a preferred embodiment of this invention.

FIG. 1 schematically shows elements of a multi-range fiber-optic reflective displacement micrometer according to a preferred embodiment of this invention. As shown in FIG. 1, the multi-range fiber-optic reflective displacement micrometer 1 according to this invention comprises a light source 11, a transmitting optical fiber 12, a receiving fiber-optic array 13, a photo-detector array 14, and a processor 15.

A light emitted from the light source 11 is sampled and guided by the transmitting optical fiber 12 and then enters into the object surface at position OS. The transmitting optical fiber 12 and the receiving fiber-optic array 13 are coplanar preferably. Moreover, the incident angle of the incident light with respect to the normal of the object surface is preferably equal to the degree of 45. However, such an angle can also be smaller than the degree of 45. Moreover, the light source 11 can be a continuous or a pulse light source. When the light source 11 is a laser beam, such a beam can be directly directed to the object surface by virtue of its converging property, without the transmitting optical fiber 12. Such a beam can also be directed to the object surface via means such as mirrors.

The receiving fiber-optic array 13 includes a plurality of receiving optical fibers $F_i$ (i=1 to n, n is an integer) parallel to each other. The receiving fiber-optic array 13 is distributed over a space covering a displacement range as the object surface moved from position OS to OS'. The receiving fiber-optic array 13 will sample the light reflected from the object surface and output the sampled light to the photo-detector array 14.

The photo-detector array 14 includes a plurality of photo detectors $D_i$ (i=1 to n, n is an integer) such as photo diodes. The quantity of the photo detectors is the same as that of the receiving optical fiber, and the detectors and fibers are in a one-to-one correspondence relationship. Each photo detector $D_i$ will output an electric signal corresponding to the light sampled by the corresponding optical fiber $F_i$ to the processor 15, in which the electric signal will be calculated. Moreover, for the sake of reducing noise, each photo detector $D_i$ and its corresponding receiving optical fiber $F_i$ can be integrally formed. Alternatively, each photo detector $D_i$ can be integrated optionally with a photo amplifier (not shown) or the processor 15.

Figure 2:
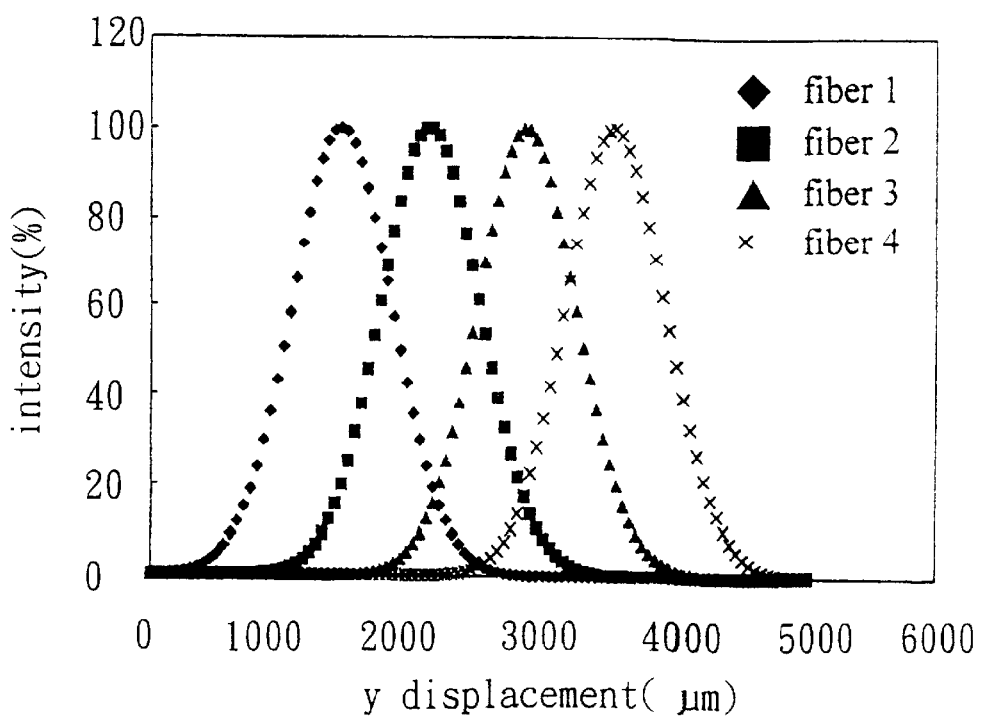
FIG. 2 is a curve showing the intensities received by four adjacent receiving optical fibers related to displacements of an object.

FIG. 2 shows the variation of the light intensity received by four adjacent receiving optical fibers in relation to the displacement of the object. The diameter of each receiving optical fiber is 1 mm and the light source is a helium-neon laser. As shown in FIG. 2, the curve of each fiber is symmetric on both sides of its center maximum point, and there are two neighboring receiving optical fibers in receiving a higher light intensity in correspondence to a certain displacement of the object.

The output of each photo detector $D_i$ is inputted to and calculated by the processor 15. The processor 15 will output a measured value representative of the displacement of the object surface. Such a measured value can be calculated by many methods. The calculating methods used in the preferred embodiment are summarized as follows. The differential signal of each pair of neighboring fibers is proportional to the object surface displacement in a section of the total range. The differential signal is divided by the summation signal so as to compensate the light intensity variation and the reflectance change of the object surface. A scale voltage is added to each output of neighboring fibers in order to shift each output upward or downward corresponding to the actual displacement. The total range of output can be selected according to the number of fibers in the receiving array.

The above calculation is described in detail below.

Referring back to FIG. 1, the calculation in terms of the detection of two neighboring optical fibers $F_i$ and $F_{i+1}$ is illustrated. The light reflected from the object surface at position OS' will be received by the two neighboring fibers $F_i$ and $F_{i+1}$ and detected by the photo detector array 14. As a result, the light intensity $I_i$ and $I_{i+1}$ respectively received by the two neighboring optical fibers $F_i$ and $F_{i+1}$ will be $$I_i = S_i K_r K_0 K_i I_0 \exp_i(-n_i r_i) \exp[-(x-a)^2/R^2(z)]/R^2(z)$$

$$I_{i+1} = S_{i+1} K_r K_0 K_{i+1} I_0 \exp_{i+1}(-n_i r_i) \exp[-(x+a)^2/R^2(z)]/R^2(z) \quad (1)$$

i=1 to n−1 wherein S is the core area of the receiving optical fiber $F_i$, $K_r$ is the reflection coefficient, $K_0$ is the transmitting loss of the transmitting optical fiber 12, $K_i$ is the transmitting loss of the receiving optical fiber $F_i$, $I_0$ is the intensity of the light source, $\exp_i(-n_i r_i)$ is the loss in the medium, x is the vertical distance from the light-receiving point LR to a juncture point SR of the two fibers, a is the radius of the receiving optical fiber, z is the distance from the light source to the receiving optical fiber, and R(z) is the effective radius of the output optical field. For two neighboring identical optical fibers $F_i$ and $F_{i+1}$, $S_i = S_{i+1}$, $K_i = K_{i+}$, and $\exp_i(-n_i r_i) = \exp_{i+1}(-n_i r_i)$.

In the processor 15, the differential signal of the two electric signals output from two photo detectors $D_i$ and $D_{i+1}$ respectively corresponding to two neighboring optical fibers $F_i$ and $F_{i+1}$ is divided by the summation signal of the two electric signals so as to obtain an output voltage $_{i+1}$, representative of the displacement y of object surface. That is $$V_{i+1,i} = \frac{I_{i+1} - I_i}{I_{i+1} + I_i} \quad (2)$$

$$= \frac{\{\exp[-(x+a)^2/R^2(z)] - \exp[-(x-a)^2/R^2(z)]\}}{\{\exp[-(x+a)^2/R^2(z)] + \exp[-(x-a)^2/R^2(z)]\}}$$

Referring back to FIG. 1, since the displacement y of the object surface OS' with respect to the juncture point SR and the x have a relationship of $x = 2y \sin\theta$, y/z and a/z would be very small and can be ignored if y and a is very small with respect to z. Moreover, since $\theta \leq 45°$, $V_{i+1}$, could be simplified and represented by the following formula (3) in case of $(x \pm a) << R(z)$.

$$V_{i+1,i} = \frac{\frac{2ax}{R(z)^2}}{1 + \left(\frac{x}{R(z)}\right)^2 + \left(\frac{a}{R(z)}\right)^2} \quad (3)$$

$$= \left[\frac{4a\sin\theta}{R(z)^2}\right] y$$

$i = 1$ to $n-1$

As indicated in the above formula (3), the output voltage $V_{i+1}$, is proportional to the displacement of the object surface within the region of two neighboring optical fibers and is irrelative to the parameters such as $I_0$, $K_0$, $K_r$, S. This implies that the effects of variation in light source intensity and reflectance change of object surface are compensated.

Based upon the above two receiving fibers arrangement, more fibers can be included into the system so as to form a fiber array as shown in FIG. 1. In such a situation, a scale voltage is added to each output of neighboring fibers in order to shift each output upward to the actual displacement from reference point R. The basic unit of scale voltage is the span voltage of neighboring fibers. The total range of output can be selected according to the number in the receiving fiber array.

Therefore, the measuring range of the micrometer is variable with the quantity of the optical fibers in the receiving fiber-optic array. Thus, micrometers having different measuring ranges are available upon necessity. Moreover, since the receiving optical fibers are sequentially arranged in a moving direction of the object, the accuracy and resolution of the micrometer are in fact determined from those values in the basical two fibers arrangement, and therefore will not vary with different measuring ranges.

Figure 3:
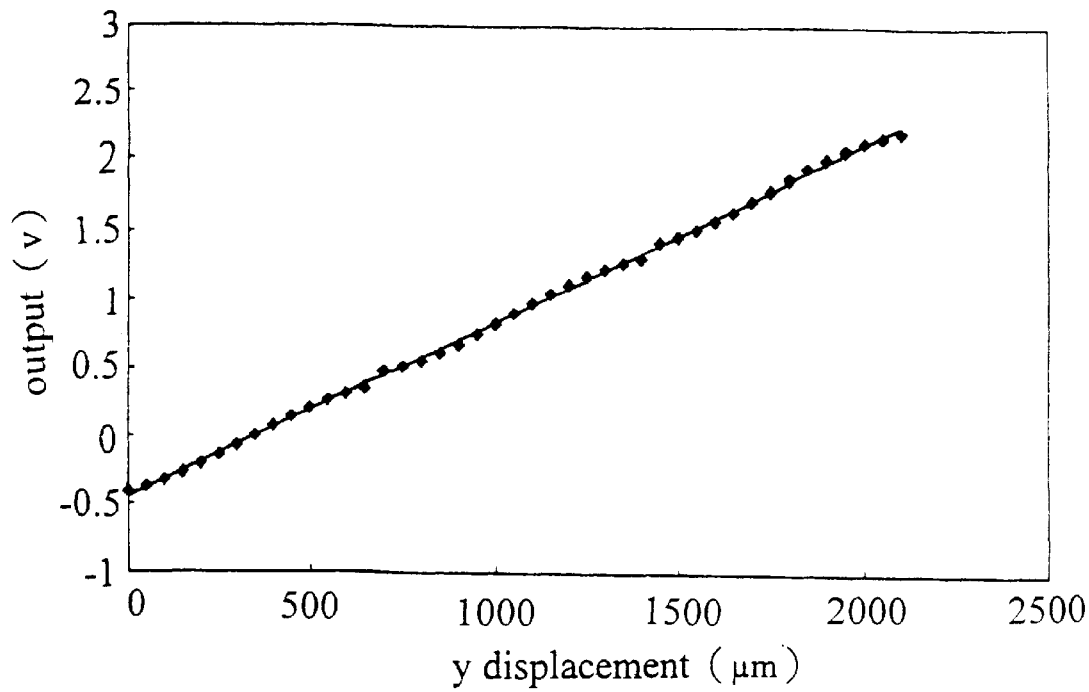
FIG. 3 is a curve showing the relationship between the voltage output and displacements of an object in accordance with the micrometer of FIG. 1.

FIG. 3 is a curve showing the relation between the measured values of voltage and displacements of the object in accordance with the micrometer shown in FIG. 1. As shown in FIG. 3, the voltage indicating the measured value increases linearly with an increment in the displacement of the object, and thus a linear measurement is available.

Figure 4:
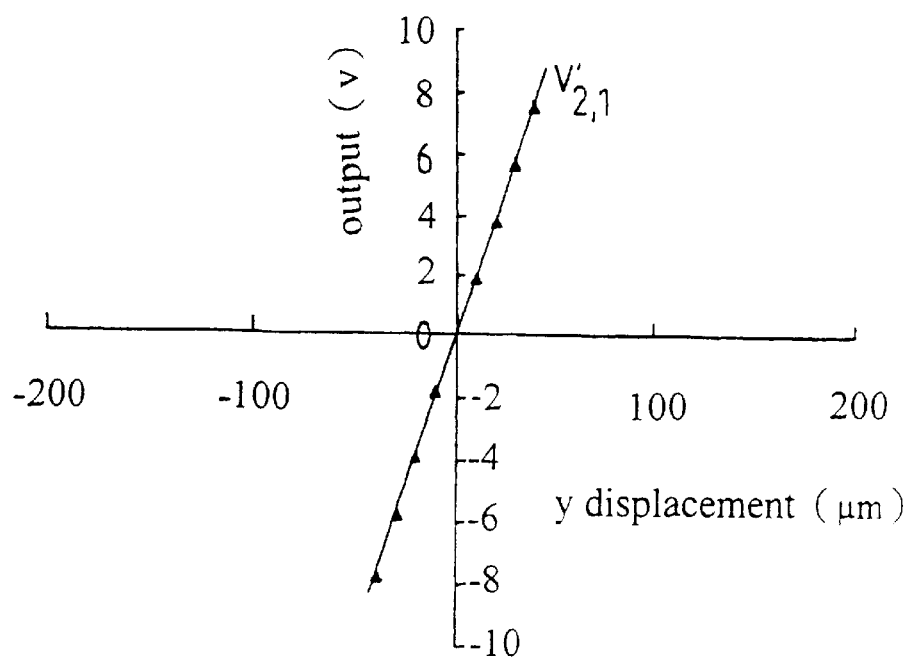
FIG. 4 is a curve showing the amplified voltage outputs of two adjacent receiving fibers with displacements of an object.

FIG. 4 is a curve showing the output voltage as a function of displacement of the object for a two-receiving-fiber system which the diameter of each receiving optical fiber is 0.5 mm and the light source is a LED. According to FIG. 4, it can be found that the sensitivity of the micrometer is 200 mV/$\mu$m. The total noise voltage below 3 Hz is reassured to the 1 mV. Therefore, in case the output voltage is two times as large as the noise voltage or 6 dB S/N power ratio, a resolution of 0.01 $\mu$m is obtained and thus a resolution in a degree of sub-micrometer is obtainable.

In view of the above, by virtue of the use of the fiber-optic array and the calculation proposed by this invention, i.e., utilizing a ratio of the difference of the two electric signals stemming from two adjacent optical fibers to the sum of the two electric signals, a multi-range, high-resolution, high-accuracy fiber-optic reflective micrometer is obtained. However, while a preferred embodiment of the present invention is described, it should be understood that various changes and modifications apparent to those skilled in the art are intended to be within the scope as defined in the appended claims.

What is claimed is:

1. A multi-range fiber-optic reflective displacement micrometer, comprising:

a light-source for emitting a beam to a surface of an object;

a receiving fiber-optic array including a plurality of receiving optical fibers parallel to each other to sample a light reflected from the surface of the object and to output a sampled light therefrom;

a photo-detector array including a plurality of optic-receivers corresponding in quantity to the receiving optical fibers so as to receive the sampled light output from the corresponding receiving optical fiber and to output an electric signal; and a processor for producing a measured value representative of displacements of the object in accordance with the electric signals output by the photo-detector array.

2. The micrometer as claimed in claim 1, wherein the light-source is selected from one of the group consisting of a continuous light and a pulse light.

3. The micrometer as claimed in claim 1, wherein the receiving fiber-optic array comprises at least two receiving optical fibers.

4. The micrometer as claimed in claim 1, wherein the incident angle of the beam incident to the object surface with respect to a normal of the object surface is smaller than or equal to 45 degree.

5. The micrometer as claimed in claim 1, wherein each of the receiving optical fibers is integrally formed with its corresponding photo-detector.

6. The micrometer as claimed in claim 1, wherein the measured value is obtained by the ratio of the differential signal and summation signal of the two electric signals output by two photo-detectors corresponding to two neighboring receiving optical fibers, and plus a scale voltage.

7. The micrometer as claimed in claim 1, wherein the extra-range voltage is derived from multiplying the number of the optical fibers located between a sub-reference point of the two adjacent optical fibers and a reference zero point by a full-scale base-range voltage while attached with a plus or minus sign according to a moving direction of the object.

\* \* \* \* \*